United States Patent
Lee et al.

(10) Patent No.: US 7,701,412 B2
(45) Date of Patent: Apr. 20, 2010

(54) APPARATUS FOR AND METHOD OF SCALING A SCANNING ANGLE AND IMAGE PROJECTION APPARATUS INCORPORATING THE SAME

(75) Inventors: Ju-Hyun Lee, Seoul (KR); Youngchul Ko, Yongin-si (KR); Plisoo Ahn, Suwon-si (KR); Jinwoo Cho, Seongnam-si (KR); Serafirnovich Pavel, Suwon-si (KR)

(73) Assignee: Samsung Electronics Co., Ltd, Suwon (KR)

( * ) Notice: Subject to any disclaimer, the term of this patent is extended or adjusted under 35 U.S.C. 154(b) by 1478 days.

(21) Appl. No.: 10/999,234

(22) Filed: Nov. 30, 2004

(65) Prior Publication Data

US 2006/0007362 A1    Jan. 12, 2006

(30) Foreign Application Priority Data

Jun. 9, 2004    (KR) ................... 10-2004-0042222

(51) Int. Cl.
*G09G 3/00*    (2006.01)
(52) U.S. Cl. ............................. 345/32; 345/86; 345/108
(58) Field of Classification Search ............. 345/32–35, 345/85–86, 104–111, 204–215
See application file for complete search history.

(56) References Cited

U.S. PATENT DOCUMENTS

| | | | |
|---|---|---|---|
| 4,692,024 A | 9/1987 | Bloss | |
| 5,048,970 A | 9/1991 | Milosevic et al. | |
| 6,426,781 B1 | 7/2002 | Lee | |
| 6,636,339 B2 | 10/2003 | Lee | |
| 7,064,876 B2 * | 6/2006 | Cannon et al. | ............... 359/204 |
| 7,186,970 B2 * | 3/2007 | Cannon et al. | ............... 250/235 |
| 2005/0024701 A1 * | 2/2005 | Cannon et al. | ............... 359/204 |
| 2005/0185235 A1 * | 8/2005 | Cannon et al. | ............... 359/204 |

FOREIGN PATENT DOCUMENTS

WO    02/37164 A1    5/2002

OTHER PUBLICATIONS

Jin-Ho Lee et al; Laser TV for Home Theater; Projection Displays VIII; vol. 4657; 2002; pp. 138-145.

* cited by examiner

*Primary Examiner*—Vijay Shankar

(57) ABSTRACT

A scalable laser scanning angle apparatus and method of scaling a scanning angle using MEMS devices and elliptical mirrors includes disposing a first scanner at one focal point of an elliptical mirror and scanning the emitted light beam in a first direction at a first scanning angle toward a concave surface of the elliptical mirror such that the scanned light beam is directed toward the second focal point of the elliptical mirror, and scanning the light beam from the concave surface of the elliptical mirror in a second direction at a second scanning angle using a second scanner, wherein the second scanner outputs the light beam across a system scanning angle which corresponds to a combination of the first scanning angle and the second scanning angle. The scanning angle is scalable by repeatedly scanning the light beam at corresponding focal points of a predetermined number of elliptical mirrors, wherein the total scanning angle is scaled by a multiple of a number of times the light beam is scanned.

4 Claims, 4 Drawing Sheets

APPARATUS FOR AND METHOD OF SCALING A SCANNING ANGLE AND IMAGE PROJECTION APPARATUS INCORPORATING THE SAME

BACKGROUND OF THE INVENTION

Rapid advances in signal processing and video production have made it possible to provide high-resolution video images. Generally, the display systems available that can reproduce the high-resolution video images are very expensive, do not provide a high quality image with sufficient brightness, or are limited in size.

One common type of video display is the CRT. To display a video image, sequences of frames are displayed very rapidly on the CRT screen. Each frame must be fully scanned by a single electron beam within a very short time period. For example, for a 60 Hz frame refresh rate, each frame must be scanned in less than 1/60 of a second. Because a frame is defined by a number of adjacent lines, each line must be scanned within a small fraction of the frame period, depending upon the size of the display. For example, in a standard VGA 640×480 format, each of the 480 lines must be scanned in less than 3.5 microseconds. Of course, higher-resolution formats (e.g., SVGA 800×600 or HDTV 1920×1080) have a greater number of pixels and lines, therefore requiring correspondingly faster line scans.

Additionally, as resolution and brightness requirements increase with better image quality, CRT-based projectors reach some physical limits and therefore, other ways to project video and computer information have been proposed and developed.

Laser TV projectors have been proposed in which red, green, and blues lasers are individually modulated and combined to generate a full color image on a projection screen. In light-modulation projectors, laser radiation is modulated in a modulator array that switches individual display elements (pixels) on or off. Liquid crystal display (LCD) panels are common light modulators. Other modulators, such as acousto-optic modulators (AOMs), deformable micro-mirrors (DMDs), and microelectromechanical system (MEMS) techniques are also available.

Projection TVs are generally not able to reproduce images with the same clarity, brightness and contrast as large LCDs and plasma screen displays, but they are less expensive. All such displays have scanning systems, comprising a horizontal scanning unit and a vertical scanning unit, to cause an image to be displayed on a screen. Generally, the horizontal scanning unit must execute the horizontal image signal scans at a much faster rate than the vertical scanning unit.

A conventional raster scanning system uses a rotating polygon mirror scanner as the horizontal scanning unit and a galvanometer mirror as the vertical scanning unit, both of which have limited bandwidth (i.e. scanning rate). The rotating polygon mirror has been used reliably for many years, but has inherent limitations in the module size of the polygon mirror and the scanning rate. For example, for an HDTV application the rotating speed of the polygon mirror would be approximately 100,000 rpm. This requires a bulky and expensive polygon scanner module.

Another approach uses multiple beams with multiple scanners to scan multiple image areas to form a whole image. Specifically, an image is divided into quadrants and each scanner is responsible for a quadrant portion of the image. However, such an approach makes for very complicated control electronics to maintain each of the different scan areas in relation to the others and the device tolerance margins must be extremely tight. Additionally, the image quality deteriorates at the border of neighboring image areas. Other approaches achieve multiple image area scans using multiple beams and a single scanner. However, the same neighboring border image artifact quality problems arise. Additionally, each of the multiple beams requires a separate modulator, which leads to complicated control systems. Furthermore, vertical scanning is difficult and a wide-angle scanner is still required to increase the size of the display.

Generally, the resolution of raster scanning projection displays directly translates into a a product of θD, where θ is the maximum scanning angle of the scanner in degrees and D is the beam width or mirror size in millimeters. Therefore, the higher the image resolution, the greater the θD value required.

For example, the horizontal scanner for drawing an HDTV image requires a θD of approximately 22.5 degree-mm. Thus, if the scanning angle θ were 8 degrees, the D would need to be approximately 2.8 mm, and if the scanning angle θ were 4 degrees, the D would need to be approximately 5.6 mm.

MEMS scanners can improve the scanning rate but have limited scanning angles, thus limiting the size of the display screen to achieve high clarity and contrast. Also, MEMS devices used as a laser scanner provide the potential of competitive cost and high frequency scanning capability. However, the scanning angle and the scanner size are in a trade-off relationship in the MEMS device under fixed characteristic frequency conditions. To preserve the characteristic frequency of the MEMS scanner for a given image resolution, the scanning angle should be decreased if the scanner size is increased according to the physical principle of rigid body's harmonic oscillator model.

The trade-off relationship may be explained by study of the following equations:

$$ax + bx + cx = N$$

$$N = N_o e^{i\omega t}$$

$$x = x_o e^{i\omega t}$$

$$x_o = \frac{N_o}{\sqrt{(c - \omega^2 a) + i\omega b}} = \frac{N_o}{\sqrt{a^2(\omega_o^2 - \omega^2)^2 + (\omega b)^2}} e^{i\Delta}$$

$$\omega_o^2 = c/a$$

Where x is the scanning angle, $\omega_o$ is the characteristic frequency and c is the spring constant of the hinge of the MEMS scanning mirror, a is the inertia moment, b is a damping factor, c is a spring constant and N is the driving force. Scanner size is closely related to the inertia moment a. Assuming that $\omega_o$ is maintained regardless of increases in the mirror size, then the inertia moment a will be increased and the spring constant c should be increased by the same fractional ratio as the inertia moment a. This results in the decrease of the scanning angle when the driving force N and the damping factor b are fixed.

What is needed is to develop a method and apparatus, which can increase the scanning angle without the trade-off with the mirror size. This would be especially useful for large, high-resolution, rear or front projection TVs to enable a clearer picture and better manufacturability.

SUMMARY OF THE INVENTION

It is an aspect of the present invention to provide a laser scanning apparatus, including a plurality of elliptical mirrors each having first and second focal points disposed so that one of the first and second focal points of each elliptical mirror is shared with another elliptical mirror, and a plurality of scanners disposed at the first and second focal points of each elliptical mirror scanning an incident light beam, wherein each of the elliptical mirrors reflects the scanned light from one of the plurality of scanners at the first focal point to another of the plurality of scanners at the second focal point, thereby increasing a system scanning angle.

According to an aspect of the present invention, alternate scanners scan the incident light beam in opposite directions.

According to an aspect of the present invention, the scanners scan the laser beam across an equal scanning angle.

According to an aspect of the present invention, the scanners horizontally scan the incident light beam.

According to another aspect of the present invention, the scanners vertically scan the incident light beam.

According to an aspect of the present invention, a scalable laser scanning angle apparatus, including a light source emitting a light beam, a first elliptical mirror having first and second focal points, a first scanner disposed at the first focal point of the first elliptical mirror to scan the emitted light beam in a first direction at a first scanning angle to a concave surface of the first elliptical mirror such that the scanned light beam passes through the second focal point of the first elliptical mirror, and a second scanner disposed at the second focal point of the first elliptical mirror to scan the light beam from the concave surface of the first elliptical mirror in a second direction at a second scanning angle, wherein the second scanner outputs the light beam across a system scanning angle which corresponds to a combination of the first scanning angle and the second scanning angle is provided.

According to another aspect of the present invention, a second elliptical mirror having third and fourth focal points is disposed such that the third focal point is the same as the second focal point of the first elliptical mirror, and a third scanner is disposed at the fourth focal point of the second elliptical mirror to scan the light beam reflected by the second elliptical mirror output from the second scanner.

According to another aspect of the present invention, multiple elliptical mirrors are arranged such that each of the elliptical mirrors shares at least one focal point with another elliptical mirror, and multiple scaling scanners are disposed at the foci of each of the elliptical mirrors, such that the scaling scanners scan the light beam output from the second scanner, wherein each of the elliptical mirrors reflects the scanned light from one of the scaling scanners at one focal point to another of the scaling scanners at another focal point thereby increasing the system scanning angle.

According to an aspect of the present invention, the scalable laser scanning apparatus further includes a first lens disposed between the first scanner and the concave surface of the elliptical mirror directing the scanned light beam reflected from the first scanner to the concave surface of the elliptical mirror; and a second lens disposed between the concave surface of the elliptical mirror and the second scanner directing the scanned light beam reflected from the concave surface of the elliptical mirror to the second scanner.

According to an aspect of the present invention, the light source emits a single beam.

It is an aspect of the present invention to provide a method of increasing a scanning angle of a scanner, including scanning an incident light beam at respective focal points of an elliptical mirror in opposite directions at the scanning angle such that the light beam passes through both focal points, wherein a total scanning angle of the scanner is doubled.

According to an aspect of the present invention, the method further includes scaling the scanning angle by repeatedly scanning the light beam at corresponding focal points of a predetermined number of elliptical mirrors, wherein the total scanning angle is scaled by a multiple of a number of times the light beam is scanned.

According to another aspect of the present invention, a method of scanning a laser beam, including scanning a single incident light beam in a first direction to output a first scanned light beam within a first scanning angle; and scanning the first scanned light beam in a second direction to output a second scanned light beam within a second scanning angle, wherein a system scanning angle corresponds to a combination of the first scanning angle and the second scanning angle is provided.

According to an aspect of the present invention, the first scanning angle is not equivalent to the second scanning angle.

According to another aspect of the present invention, a projection TV, including a modulated light source which emits a light beam; an elliptical mirror having a first focal point and a second focal point; a first scanner disposed at the first focal point of the elliptical mirror and scanning the emitted light beam in a first direction along a horizontal axis at a first scanning angle to a concave surface of the first elliptical mirror such that the scanned light beam passes through the second focal point of the first elliptical mirror; a second scanner disposed at the second focal point of the elliptical mirror scanning the light beam from the concave surface of the elliptical mirror in a second direction along the horizontal axis at a second scanning angle, wherein the second scanner outputs the light beam across a system scanning angle which corresponds to a combination of the first scanning angle and the second scanning angle; a vertical scanning system disposed to receive the light beam output from the second scanner and scan the received light beam in a direction substantially orthogonal to the first and second directions; and a screen disposed to receive the light beam scanned by the vertical scanning system and the first and second scanners, wherein an image is formed on the screen of the projection TV is provided.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
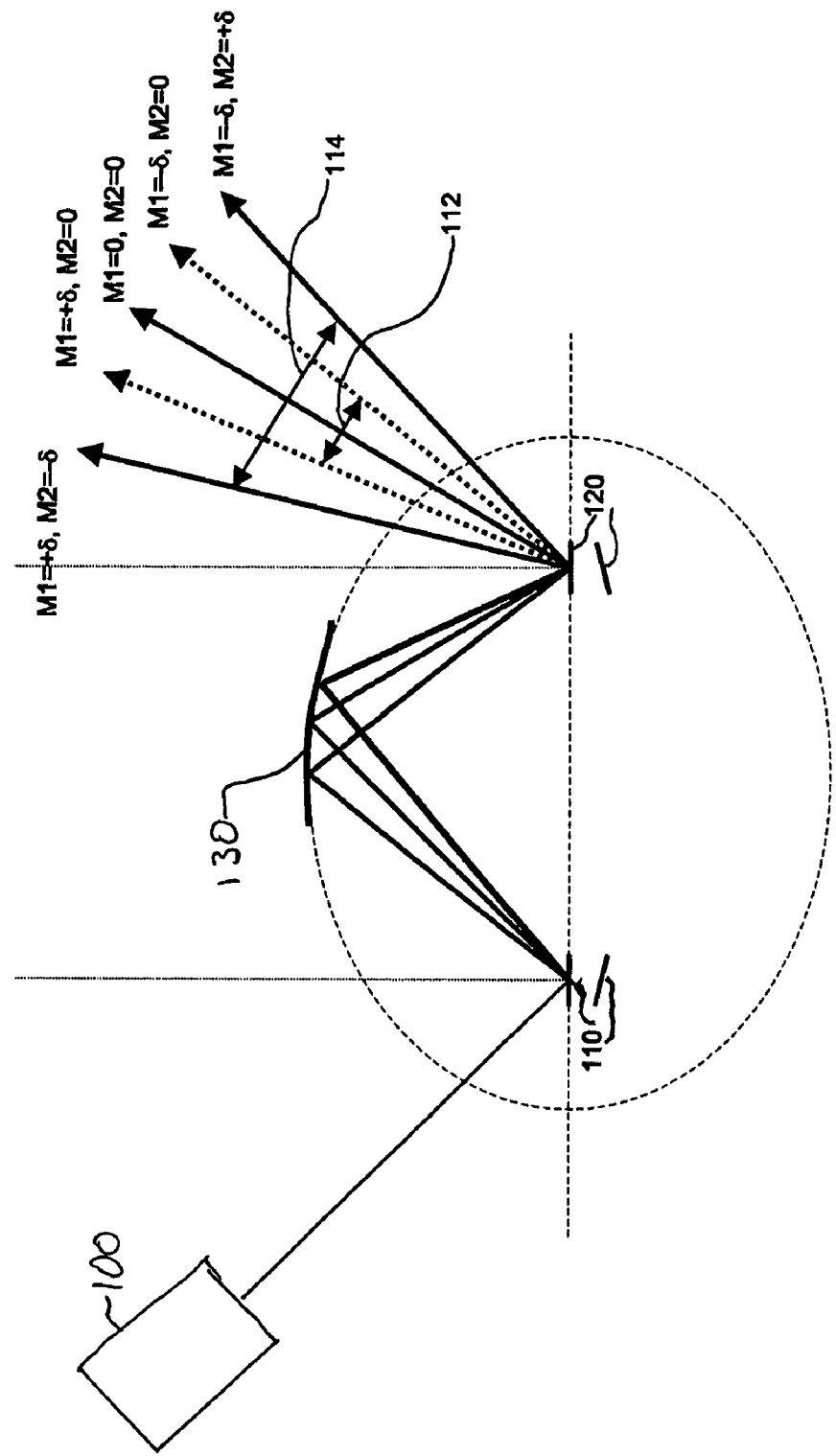
FIG. 1 is a schematic view of an embodiment of an optical scanner apparatus.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a schematic view of an embodiment of an optical scanner apparatus that has a scalable scanning angle. Referring to FIG. 1, the optical scanner apparatus comprises a first optical scanner 110, a second optical scanner 120 and an elliptical mirror 130. The first optical scanner 110 and the second optical scanner 120 are disposed at respective foci of the elliptical mirror 130. The first optical scanner 110 and the second optical scanner 120, respectively, oscillate a reflective surface through a predetermined range. In an aspect, the first optical scanner 110 and the second optical scanner 120 are microelectromechanical system (MEMS) optical scanners.

A beam of light emitted from the light source 100 travels in a constant direction onto a reflective surface of the first optical scanner 110, which reflects the beam of light within a range of a first predetermined angle, +/−δ. The elliptical mirror 130 is disposed on the optical traveling path of the reflected beam of light from the first optical scanner 110, and because the first optical scanner 110 is disposed at one of the foci of the elliptical mirror 130 the beam of light will pass through the other focal point of the elliptical mirror 130 after reflecting from the concave surface of the elliptical mirror 130. Disposed at the other focal point is the second optical scanner 120, which reflects the beam of light from the elliptical mirror within a range of a second predetermined angle, −/+δ. For example, if only one optical scanner is used then reference 112 is the scanning angle, and if two optical scanners are used then reference 114 is the scanning angle.

The light source 100 is comprised of a single beam white laser (not shown) and through various optic elements (not shown) may be split into separate RGB signals and recombined into a single beam after modulation (not shown). Such a configuration is beneficial for use with a projection TV to enhance the resolution while simplifying the modulation control necessary. Using laser beams rather than a lamp as a light source has several advantages, such as a higher contrast ratio, and an increase in the color space. It is understood that the light source 100 may be comprised of separate lasers for each RGB signal, respectively, and the separate signals may then be combined into a single beam with optics prior to passing through the optical scanner apparatus.

The optical scanner apparatus scales or adds the scanning angles of the individual first optical scanner 110 and second optical scanner 120 by scanning the first optical scanner 110 and the second optical scanner 120 in opposite directions, respectively. For example, driving the first optical scanner 110 in the positive direction, +/−δ, and driving the second optical scanner 120 in the negative direction, −/+δ, results in a combined scanning angle for the optical scanner apparatus which is two times larger than the scanning angle produced by either optical scanner alone. Preferably, but not necessarily limited to, each optical scanner 110 and 120 are driven by separate drivers. The drivers may be synchronized by external trigger signals. For more precise operation of the scanners 110 and 120, the drivers also control the phase differences between the external trigger signal and the scanner driving signal.

It is understood that in another aspect of the optical scanner apparatus, the scanning angles of the first optical scanner 110 and the second optical scanner 120 may not be equal, though still driven in opposite scanning directions. Also, the scans of each optical scanner may be set to complete only a partial scanning angle such that a desired system scanning angle in the range of +/−2 δ may be achieved. Furthermore, the scanning frequencies of the first optical scanner 110 and the second optical scanner may be different.

Figure 2:
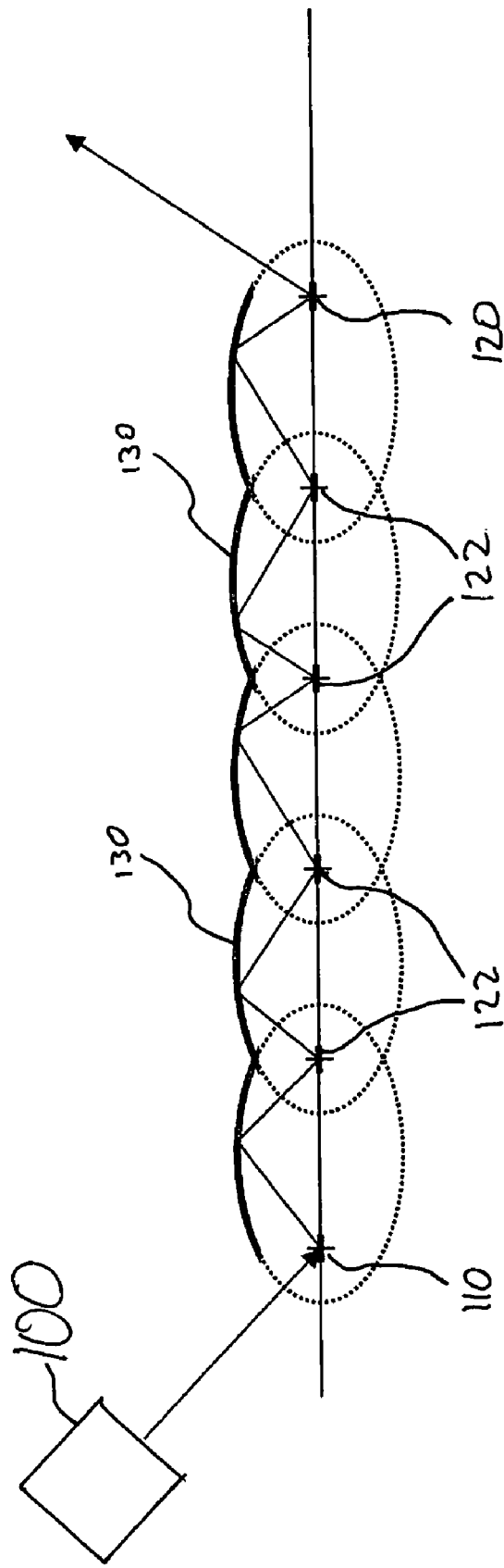
FIG. 2 is a schematic view of an embodiment of the optical scanner apparatus of FIG. 1 scaled to increase the scanning angle of the apparatus.

FIG. 2 is a schematic view of another embodiment of the optical scanner apparatus of FIG. 1 scaled to increase the horizontal scanning angle of the apparatus. Referring to FIG. 2, a plurality of elliptical mirrors 130 each having first and second focal points are disposed such that each elliptical mirror 130 shares at least one focal point with an adjacent elliptical mirror 130. The first and last elliptical mirrors 130 in the optical scanner apparatus share only one focal point with another elliptical mirror, while each of the elliptical mirrors 130 in between the first and last elliptical mirrors will share both foci. Though the five elliptical mirrors 130 are illustrated as touching this arrangement is not required. The elliptical mirror 130 reduces color aberration in the system.

A first optical scanner 110 is disposed at the first focal point of the first elliptical mirror 130 and a shared optical scanner 122 is disposed at the second focal point of the first elliptical mirror 130. Additional shared optical scanners 122 are disposed at each of the focal points of the elliptical mirrors 130 in between the first and last elliptical mirrors 130. In the last elliptical mirror 130, a shared optical scanner 122 is disposed at the first focal point and a second optical scanner 120 is disposed at the second focal point.

An example operation of the scaled optical scanner apparatus will be described. The light source 100 emits a light beam in a constant direction onto a reflective surface of the first optical scanner 100 which scans the emitted light beam in a first direction within a first scanning angle to a concave reflective surface of the first elliptical mirror 130 such that the scanned light beam passes through the second focal point of the first elliptical mirror 130. The shared optical scanner 122 disposed at the second focal point of the first elliptical mirror 130 scans the light beam reflected from the concave surface of the first elliptical mirror 130 in a second direction within a second scanning angle. The shared optical scanner 122 outputs the light beam to the next elliptical mirror 130 and the light beam proceeds through the remaining elliptical mirrors 130 and shared optical scanners 122 of the optical scanner apparatus until the scanned light beam is finally output by the second optical scanner 120. The scanned light beam is output across a system scanning angle range that corresponds to a combination of each of the scanning angles of the respective optical scanners.

For example, in an optical scanner system having 5 elliptical mirrors 130 and a total of 6 optical scanners 110, 120 and 122, wherein each have a scanning angle of +/−1.5 degrees, the system scanning angle is approximately +/−1.5×6=+/−9 degrees. It is understood that other numbers besides 5 elliptical mirrors and 6 optical scanners may be used to achieve the desired scanning angle scaling result. For example, using 2 elliptical mirrors and 3 optical scanners with a +/−1.5 degree scanning angle would yield a system scanning angle of approximately +/−4.5 degrees. Thus, the optical scanner apparatus may be scaled to a desired scanning angle by adding or removing additional elliptical mirrors and optical scanners.

Figure 3:
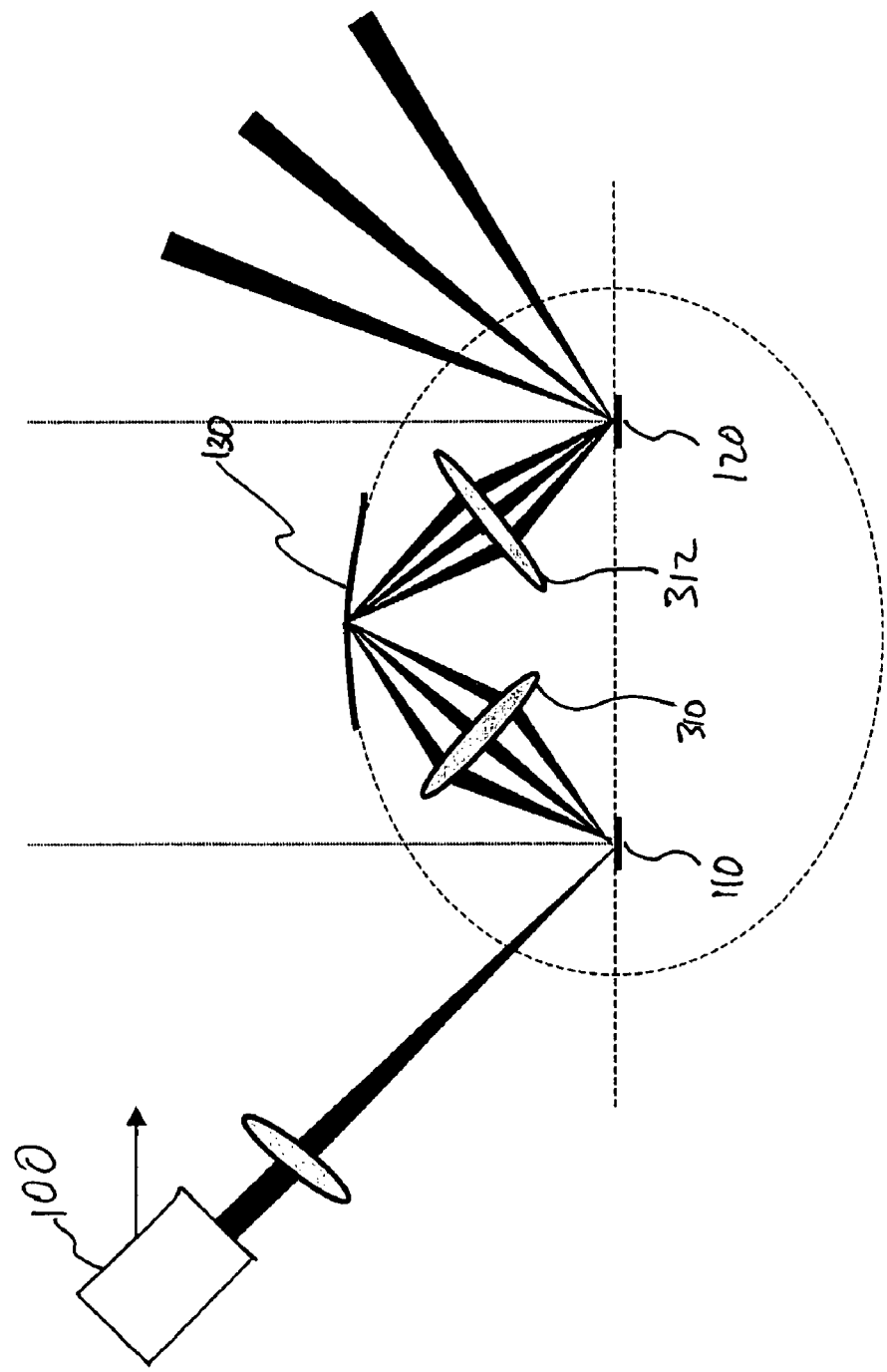
FIG. 3 is a schematic view of another embodiment of an optical scanner apparatus, which illustrates focusing optics.

FIG. 3 is a schematic view of another embodiment of an optical scanner apparatus, which illustrates focusing optics disposed between the first optical scanner 110 and the second optical scanner 120, respectively, and the elliptical mirror 130. The optics comprise a first lens 310 that focuses the scanned light beam from the first optical scanner 110 to the concave reflective surface of the elliptical mirror 130. A second lens 312 focuses the light beam reflected from the reflective surface of the elliptical mirror 130 onto a surface of the second optical scanner 120. Because of the scaling properties of the optical scanner apparatus, the error may be magnified and thus the optics may be used to minimize the dispersal error. It is to be understood that in some embodiments (not shown in FIG. 3), the first lens 310 and the second lens 312 may also each be implemented with two convex lens separated from each other and the scanning mirror and the elliptical mirror 130 by predetermined focal lengths. For example a first lens is separated from the first scanner 110 by a focal length, f, a second lens is separated from the first lens by a second focal length, 2f, and the second lens is separated from the elliptical mirror 130 by the focal length, f. Other appropriate optical elements may also be included to insure that the light beam does not become too dispersed, thus introducing error, during propagation through the optical scanner apparatus. For example, collimating lenses and focusing lenses disposed to control and focus the scanned light beam output from the first optical scanner 110 prior to reflecting from the elliptical mirror 130 and after reflecting from the elliptical mirror 130 before scanning by the second optical scanner 120. Turning the planar scan into a 2-dimensional image will be described with reference to a use of the optical scanner apparatus in a projection TV.

Figure 4:
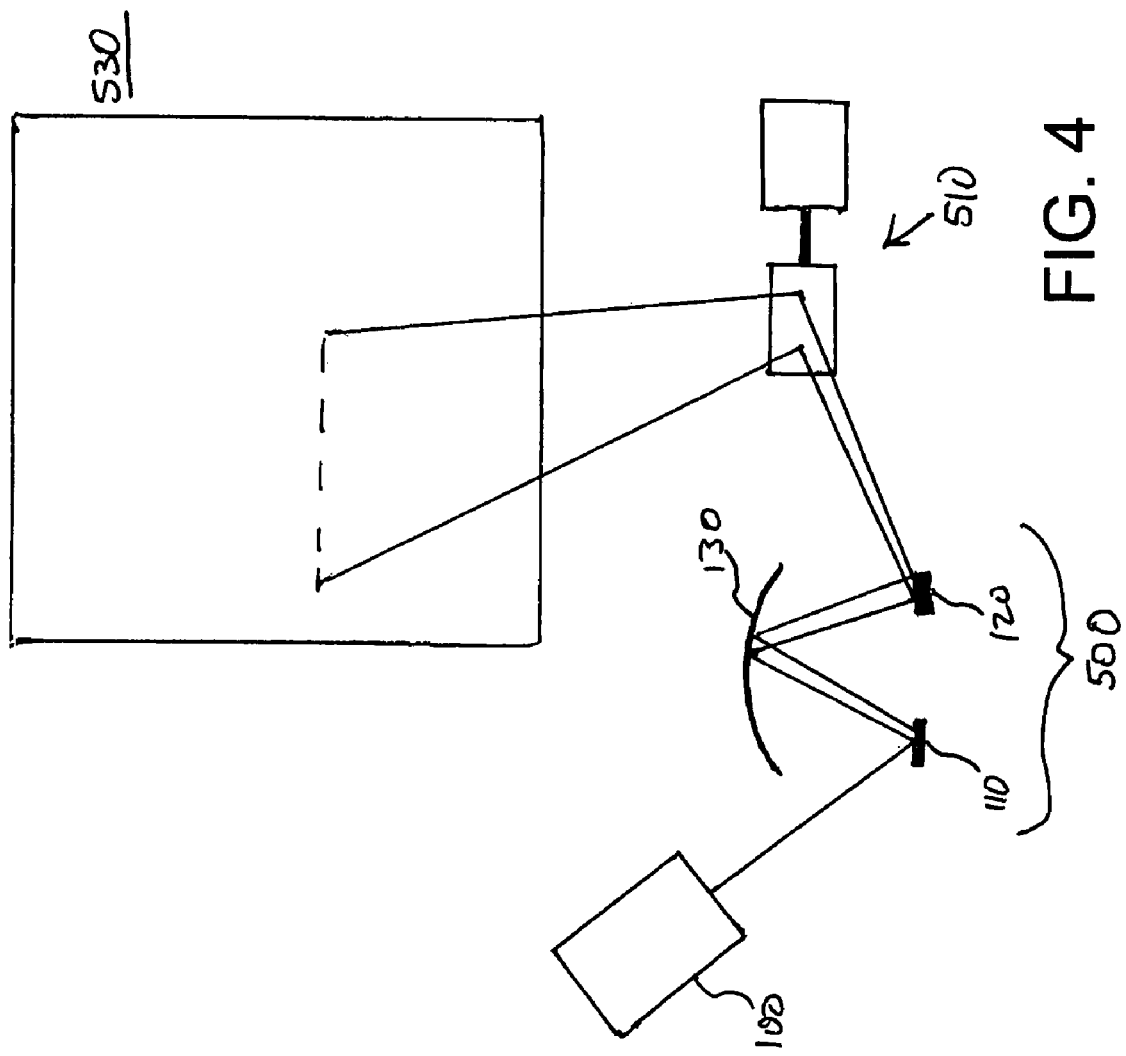
FIG. 4 is a schematic view of a laser image projector incorporating the optical scanner apparatus of FIG. 1.

FIG. 4 is a schematic view of a laser image projector incorporating the optical scanner apparatus of FIG. 1 in a projection TV. Referring to FIG. 4, the optical scanner apparatus 500 comprises a first optical scanner 110, a second optical scanner 120 and an elliptical mirror 130 that scan an incident light beam in a horizontal direction. The first optical scanner 110 and the second optical scanner 120 are disposed, respectively, at the foci of the elliptical mirror 130. A beam of light emitted from a modulated light source 100 travels in a constant direction onto a reflective surface of a first optical scanner 110, which reflects the beam of light within a range of a first predetermined angle. Because the first optical scanner 110 is disposed at one of the focal points of the elliptical mirror 130 the beam of light will pass through the other focal point of the elliptical mirror 130 after reflecting from the concave surface of the elliptical mirror 130. Disposed at the other focal point of the elliptical mirror 130 is the second optical scanner 120, which reflects the beam of light from the elliptical mirror 130 within a range of a second predetermined angle, which is the same magnitude as, but in an opposite scan direction to, the first optical scanner 110. The scanned light beams are reflected from the second optical scanner 120 and directed to a galvanometer 510 that scans the light beam in a vertical direction. Since the light beams are scanned in opposite directions by each optical scanner 110 and 120 the scanning angles of the individual optical scanners 110 and 120 are summed to provide a total system horizontal scanning angle which is approximately twice that of the individual scanning angles of the optical scanners 110 and 120. The galvanometer 510 and the concomitant control are well known in the art and will not be further described.

The output from the galvanometer 510 comprises horizontally and vertically scanned light beams that are projected onto the screen 530 of the projection TV. The screen 530 of the projection TV is scanned from left to right and top to bottom, though other orientations may also be used such as bidirectional horizontal scanning. The horizontally and vertically scanned light beams may be used in either a transmittive or a reflective projector. In either case, projection optics (not shown) such as a variety of lenses and other optical elements may be disposed between the galvanometer 510 and the screen 530 to create a viewable image on the screen 530. The projection optics are well known to one of ordinary skill in the art.

In another aspect, a single MEMS vertical optical scanner may be substituted for the galvanometer 510 as the vertical scanning unit in the image projector of the projection TV. In projection TV systems, the vertical scan angle is relatively small and substitution of a single MEMS for the galvonometer 510 is straightforward. However, in other systems that require a large vertical scanning angle, the optical scanner system of FIG. 1 may be used as an angle adder to increase the size of the scan angle.

Although the optical scanner apparatus 500 shown in FIG. 4 is implemented in a projection TV, the optical scanner apparatus may be constructed with a reverse structure. In particular, the image screen 530 may be an object to be scanned and the light source 100 may be replaced with photodetectors. In this case, the optical scanner apparatus acts as an image scanner for reading an image of the object as a linear electrical signal. Such an image scanner may be used as a general image scanner for generating a computer image file from a photograph, or as a bar code reader for reading product bar codes. Additionally, the optical scanner apparatus shown in FIG. 1 may be incorporated into other laser scanning devices such as copying machines or laser printers.

As discussed above, an optical scanner apparatus which when implemented in a projection TV provides improved resolution and brighter images at a reasonable cost. The optical scanner uses MEMS devices arranged to scale the scanning angle of an individual MEMS device by a multiple to overcome the size and resolution restrictions imposed by a single MEMS device used as a laser beam scanner.

The optical scanner apparatus according to aspects of the present invention eases the burdens of scanner design by permitting an increase in scanner size by reducing the scanning angle of each individual scanner by utilizing the scalable scanning angle approach for a large system scanning angle.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of scanning a laser beam, comprising:
    scanning a single incident light beam in a first direction to output a first scanned light beam within a first scanning angle; and
    scanning the first scanned light beam in a second direction to output a second scanned light beam within a second scanning angle, wherein a system scanning angle corresponds to a combination of the first scanning angle and the second scanning angle according to a curvature of a reflection surface reflecting the output first scanned light beam toward a point for the scanning of the first scanned light beam in the second direction,
    wherein the scanning of the single incident light beam is performed at a focal point of the reflection surface.

2. A method of scanning a laser beam, comprising:
    scanning a single incident light beam in a first direction to output a first scanned light beam within a first scanning angle;
    scanning the first scanned light beam in a second direction to output a second scanned light beam within a second scanning angle, wherein a system scanning angle corresponds to a combination of the first scanning angle and the second scanning angle; and
    reflecting the first scanned light through foci of an elliptical mirror before the scanning the first scanned light beam in the second direction.

3. The method of claim 1, wherein the first direction is opposite to the second direction.

4. The method of claim 1, wherein the first scanning angle is not equivalent to the second scanning angle.

* * * * *

UNITED STATES PATENT AND TRADEMARK OFFICE
CERTIFICATE OF CORRECTION

| | | |
|---|---|---|
| PATENT NO. | : 7,701,412 B2 | Page 1 of 1 |
| APPLICATION NO. | : 10/999234 | |
| DATED | : April 20, 2010 | |
| INVENTOR(S) | : Ju-hyun Lee et al. | |

It is certified that error appears in the above-identified patent and that said Letters Patent is hereby corrected as shown below:

First Page, Column 1 (Inventors), Line 2, change "Plisoo" to --Pilsoo--.

First Page, Column 1 (Inventors), Line 4, change "Serafirnovich" to --Serafimovich--.

Signed and Sealed this

Sixth Day of July, 2010

David J. Kappos
*Director of the United States Patent and Trademark Office*